(12) United States Patent
Sun

(10) Patent No.: US 10,521,328 B1
(45) Date of Patent: Dec. 31, 2019

(54) APPLICATION DATA FLOW MAPPING

(71) Applicant: SAP SE, Walldorf (DE)

(72) Inventor: Xun Sun, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/166,284

(22) Filed: Oct. 22, 2018

(51) Int. Cl.
*G06F 11/36* (2006.01)

(52) U.S. Cl.
CPC .................. *G06F 11/3612* (2013.01)

(58) Field of Classification Search
CPC ................................................ G06F 11/3612
USPC ............................................................ 717/132
See application file for complete search history.

(56) References Cited

U.S. PATENT DOCUMENTS

| 8,627,272 | B1* | 1/2014 | Lin ........................... G06F 8/10 717/104 |
| 9,239,688 | B2* | 1/2016 | Colgrove .............. G06F 3/0608 |
| 9,304,746 | B2* | 4/2016 | Dim .......................... G06F 8/36 |
| 9,569,385 | B2* | 2/2017 | Ahmad ................ G06F 13/287 |
| 9,753,812 | B2* | 9/2017 | Pawar ................... G06F 16/128 |
| 2005/0055435 | A1* | 3/2005 | Gbadegesin ............. H04L 29/06 709/224 |
| 2012/0060145 | A1* | 3/2012 | Schloegel ............... G06F 8/451 717/107 |
| 2014/0025984 | A1* | 1/2014 | Childers, Jr. ....... G06F 11/1474 714/4.1 |
| 2014/0365745 | A1* | 12/2014 | Colgrove .............. G06F 3/0608 711/170 |
| 2016/0117357 | A1* | 4/2016 | Colrain ................. G06F 9/5027 707/703 |
| 2016/0224251 | A1* | 8/2016 | Xu ........................ G06F 16/196 |
| 2017/0236130 | A1* | 8/2017 | Kee ..................... G06F 21/6227 705/7.26 |

OTHER PUBLICATIONS

Dorit et al., Outer-Loop Vectorization . . . , Oct. 25, 2008, ACM, pp. 2-11.*

* cited by examiner

*Primary Examiner* — John Q Chavis
(74) *Attorney, Agent, or Firm* — Buckley, Maschoff & Talwalkar LLC

(57) ABSTRACT

Provided is a method and system for mapping a data flow of web-based application for use in testing. In one example, the method may include one or more of receiving, via a network, a plurality of uniform resource locator (URL) requests for an application that is hosted by a web server, identifying a set of read requests for the application and a set of write requests for the application, from among the received URL requests, generating a data flow mapping identifying which read requests from the set of read requests are associated with which write requests from the set of write requests based on data items accessed by the read requests and the write requests, and storing the generated data flow mapping within a storage device.

20 Claims, 6 Drawing Sheets

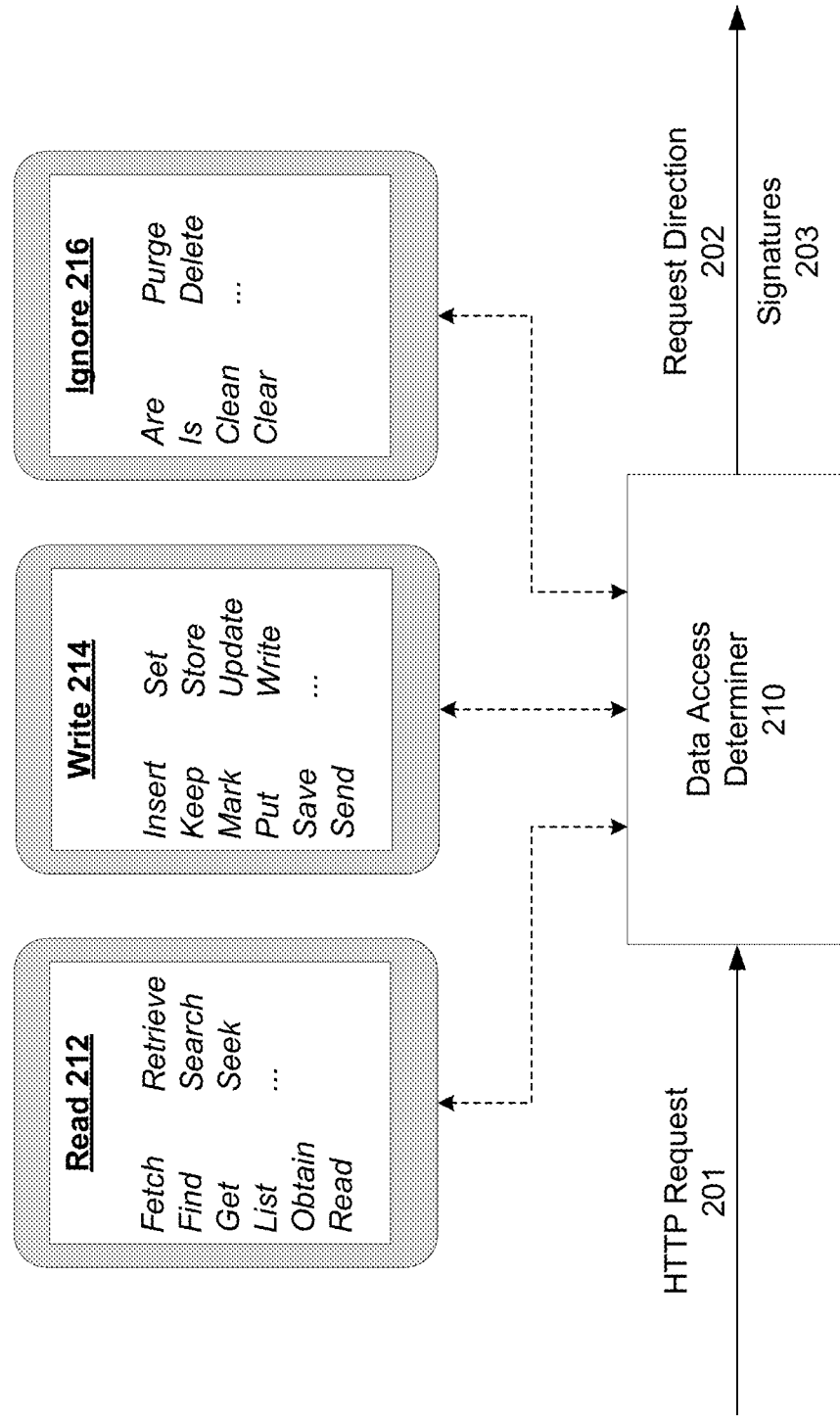

FIG. 3

| Key | Value Description |
|---|---|
| Request URL | URL of the Request w/o Headers |
| Direction | Read or Write |
| Tenant ID | Tenant ID (Num, Char, String, etc.) |
| Signature 1 | First Hash Value |
| Signature 2 | Second Hash Value |
| . . . | More Hash Value(s) |
| Signature N | Last Hash Value |

FIG. 4

| Request URL | Type | Tenant ID | Hash Data |
|---|---|---|---|
| Request URL 1 | Direction 1 | Tenant ID 1 | Signature 11<br>Signature 12<br>...<br>Signature 1N |
| | | Tenant ID 2 | Signature 21<br>Signature 22<br>...<br>Signature 2N |
| Request URL 2 | Direction 2 | Tenant ID 3 | Signature 31<br>Signature 32<br>...<br>Signature 3N |
| | | Tenant ID 4 | Signature 41<br>Signature 42<br>...<br>Signature 4N |

FIG. 5

Data Flow Map

Key
1 = Match
0 = No Match

| | Read Request 1 | Read Request 2 | Read Request 3 | Read Request 4 | ... | ... | Read Request N |
|---|---|---|---|---|---|---|---|
| Write Request 1 | 1 | 1 | 0 | 1 | ... | ... | 0 |
| Write Request 2 | 1 | 0 | 1 | 0 | ... | ... | 1 |
| Write Request 3 | 0 | 1 | 0 | 0 | ... | ... | 0 |
| Write Request 4 | 1 | 0 | 0 | 1 | ... | ... | 1 |
| ... | ... | ... | ... | ... | ... | ... | ... |
| ... | ... | ... | ... | ... | ... | ... | ... |
| Write Request M | 0 | 1 | 1 | 0 | ... | ... | 0 |

500

502

APPLICATION DATA FLOW MAPPING

BACKGROUND

Web applications are programs which are typically stored on a remote server and accessed through the Internet. Because a web application is exposed to the public through the Internet, it is critical for owners and developers of the web application to protect the web application from malicious users. Insecure software can be detrimental to web applications in many other areas of technology including financial, healthcare, defense, energy, and other critical infrastructure. As web applications become increasingly complex and connected, the difficulty of achieving application security increases exponentially. The rapid pace of modern software development processes makes the most common risks essential to discover and resolve quickly and accurately. Therefore, even simple security problems can no longer be tolerated.

In order to protect a web application, testing is often performed on a routine basis to ensure that the web application is performing as expected. To adequately test and protect the web application, a tester must have a clear understanding of its structure. This is especially true for complex systems such as cloud-based applications. However, the complexity of a web application creates an inherent challenge because it can be difficult to clearly describe an application's structure in terms of data flow. Accordingly, an improved mechanism for understanding a how data flows into and out of a web application is needed.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2 is a diagram illustrating a process of determining a type of URL request in accordance with an example embodiment.

FIG. 3 is a diagram illustrating a storage structure for storing a summary of a URL request in accordance with example embodiment.

FIG. 4 is a diagram illustrating a data storage format for storing a group of URL requests of an application in accordance with an example embodiment.

FIG. 5 is a diagram illustrating a data flow map of a web-based application in accordance with an example embodiment.

Figure 1:
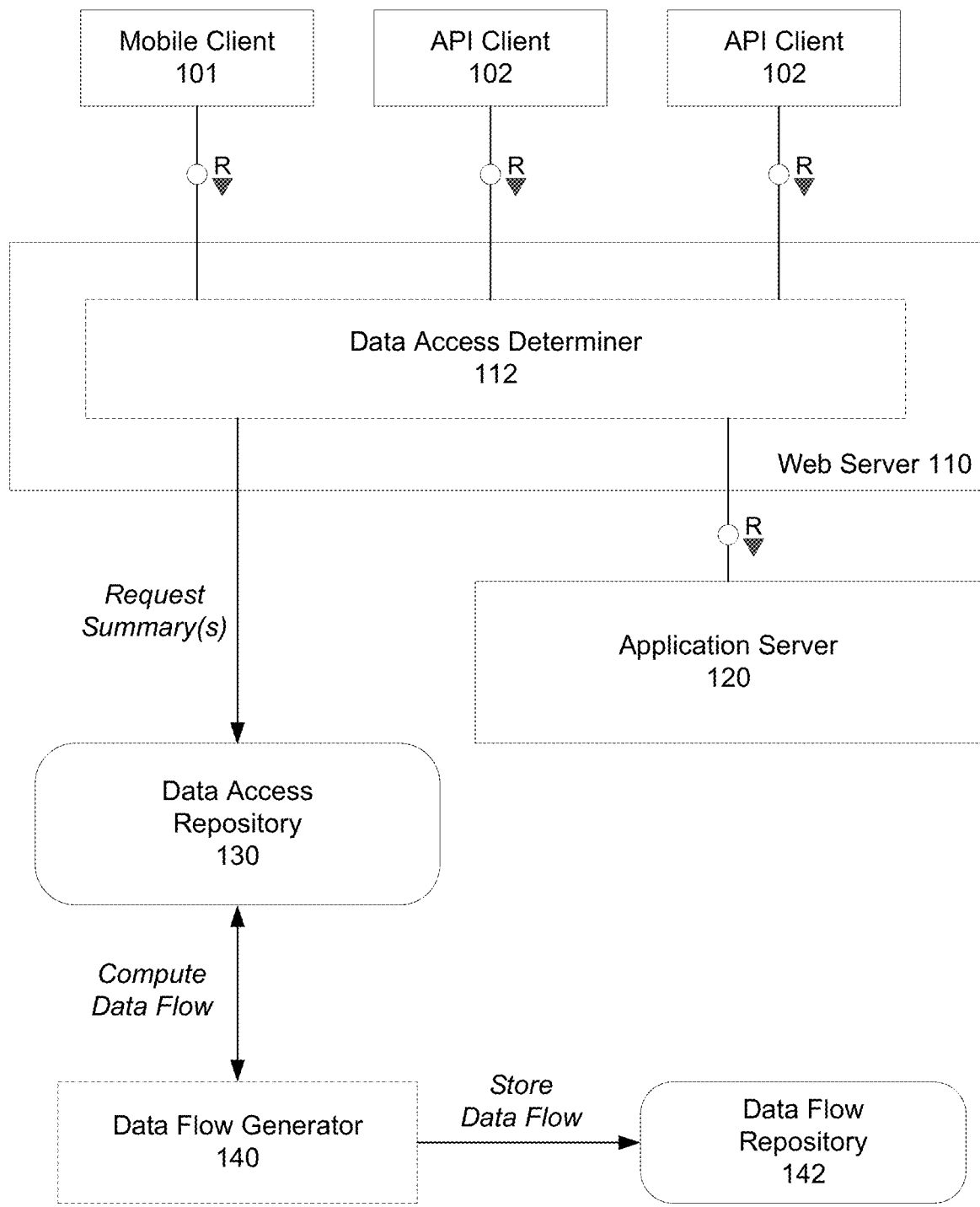
FIG. 1 is a diagram illustrating an application data flow mapping architecture in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Web applications have become ubiquitous in part due to the widespread adoption of cloud computing. Web applications, however, are prone to many different types of security risks including, but not limited to, injection attacks (e.g., SQL injection, etc.), broken authentication, sensitive data exposure, XML external entities, broken access control, security misconfiguration, cross-site scripting (XSS), insecure deserialization, insecure logging and monitoring, and many others. Each of these security risks can manifest themselves in different ways.

Multiple tools exist for evaluating the security of a web application including Static Application Security Testing (SAST) tools and Dynamic Application Security Testing (DAST) tools. SAST tools work by examining source code prior to implementation of the software. This type of testing can be useful during development phase, but is typically not available once a web application has been deployed. Meanwhile, DAST tools work by automatically injecting a malicious payload to an input page of the web application, and checking if the injected payload causes any malicious effects via an output page. Here, the output page can be same or different as the input page. When the testing involves more than one page, DAST relies on a human operator to specify the input page and output page. This requires the human operator to have familiarity with the data flow and structure of the web application. This requirement might be acceptable for simple web applications where it is easy to remember the data flow. However, for complex and commercial web applications, it can be difficult for a user to remember a comprehensive flow of data into and out of the web application.

The example embodiments overcome the technical deficiencies of the prior art by providing a system that can analyze a data flow of a complex web application and generate a data flow map that identifies a structure of the underlying web application. The map provides a tester with a comprehensive understanding of the relationships between data coming into the application (write requests) and data going out of the application (read requests). Furthermore, the system may operate in a web layer so that it can be deployed within an existing web server and without requiring architectural changes to the application itself. Accordingly, the system may inspect Hypertext Transfer Protocol (HTTP) requests as data flows into and out of the web application, and non-intrusively mine an application's structure over time as users gradually interact with the web application.

The output of the system is a comprehensive data flow map which may be in the format of a two-dimensional table, chart, or the like. For example, rows and columns in the table may be used to represent a set of write requests versus a set of read requests of the web application. When a write request and a read request are associated with one another (i.e., when data written by a write request is ultimately read by a read request, etc.), a cell of the table that pairs with both the write request and the read request can include a value identifying a relationship therebetween. For example, cells in the table may be given an initial value (e.g., zero, false, etc.) which indicates that the write request and the read request are not a match. When the system determines that a write request and a read request are paired together, the system may change the initial value to a matching indicator (e.g., change zero to one, false to true, etc.). In this way, values in the cells of the map may be used to indicate whether write requests and read requests are directly related to each other.

Another feature of the system is the ability to decipher whether an HTTP request is a read request, a write request, or a request that can be ignored for mapping purposes, based on a uniform resource locator (URL) path of the request. Here, the HTTP request may be referred to as a URL request. In some embodiments, the system may look for pre-defined keywords (verbs, etc.) within the path name of the URL request (often at the end of the path) to determine if the request is a read request or a write request. As another example, the system may look at the amount of data being input versus the amount of data being output to determine whether the URL request is a write request or a read request.

During the operation of the application, the requests may be captured and stored as request summaries which have a common data structure regardless of whether the request is a read request or a write request. Furthermore, the system may convert the request summaries into a storage format in which all requests of an application are combined. The system may then correlate the read requests and the write requests based on data items (or hashed signatures of the data items) accessed by the read and write requests, and generate a data flow map according thereto. If a write request and a read request use the same data items, the write request and the read request may be determined as a match.

FIG. 1 illustrates an application data flow mapping architecture 100 in accordance with an example embodiment. Referring to the example of FIG. 1, the architecture 100 includes a web server 110 and an application server 120 which hosts a web application such as a cloud application or the like. The web server 110 and the application server 120 may operate based on requests that are received from different types of clients such as mobile client 101, API client 102, web browser client 103, and the like. The application server 120 may include services that are used by the end users (e.g., clients 101, 102, 103, etc.) that interact with the application hosted by the application server 120. A client may transmit an HTTP request to the application server 120 via the web server 110. Here, the web server 110 may operate to receive and process application-based requests for the different user/clients. Also, multiple tenants may have access to the same application hosted by application server 120.

The web server 110 and the application server 120 are deployed together in this example for a common purpose of fulfilling user requests for content from a website/web application. For example, the web server 110 may accept and fulfill requests from clients 101, 102, and 103 for static content from a website (HTML pages, files, images, video, and the like). The client in this example, may be a mobile client 101 accessing the web server 110 via a mobile application. As another example, the client may be a browser-based client 103 accessing the web server 110 via a web browser, as yet another example, the client may be a client 102 such as a system or user accessing the web server 110 via an application programming interface (API). The requests take the form of a Hypertext Transfer Protocol (HTTP) message, as does the response from the web server 110. It should also be appreciated, that the web server 110 and the application server 120 may be coupled together such that the functionality is performed by one on server.

Meanwhile, the application server 120 may provide clients 101, 102, and 103 with access to business logic, which generates dynamic content. For example, the application server 120 may include code that transforms data to provide the specialized functionality offered by a business, service, or application. In some cases, the clients are applications themselves, and can include web servers and other application servers. Communication between the application server 120 and clients 101, 102, and 103 might take the form of HTTP messages, but that is not required as it is for communication between web servers and their clients.

Generally, services executing within the web server 110 may receive requests from clients 101, 102, and 103, and provides results to based on data stored within a data store. For example, the services may include server-side executable program code (e.g., compiled code, scripts, etc.) which provide functionality to the web application by providing user interfaces to clients 101, 102, and 103, receiving requests from front-end applications (e.g., drag-and-drop operations), retrieving data from an underlying data store based on the requests, processing the data received from data store, and providing the processed data to clients 101, 102, and 103.

In one non-limiting example, a client may execute an application to perform visual analysis of analytical data output to a user interface on a display of the client which allows the user to view analytical information such as charts, graphs, tables, and the like, based on underlying client data. The application server 120 may pass analytic information based on the input back to the client. The services executing on application server 120 may communicate with a DBMS (not shown) using database management interfaces such as, but not limited to, Open Database Connectivity (ODBC) and Java Database Connectivity (JDBC) interfaces. These types of services may use SQL to manage and query data stored in a data store.

Each of clients 101, 102, and 103 may include one or more devices executing program code of an application for presenting user interfaces to allow interaction with the web server 110 and the application server 120. The user interfaces may comprise user interfaces suited for reporting, data analysis, and/or any other functions. Presentation of a user interface may include any degree or type of rendering, depending on the type of user interface code generated by the web server 110. For example, a client 103 may execute a Web Browser to request and receive a Web page (e.g., in HTML format) from application server 120 via HTTP, HTTPS, and/or WebSocket, and may render and present the Web page according to known protocols. As another example, a client 101 may execute a mobile application to receive application data from the application server 120. Likewise, an application, a program, a device, a system, a user, etc., referred to as API client 102 may access the application server 120 via an API.

According to various embodiments, the web server 110 may be newly configured with a data access determiner 112 which may be a program running on the web server 110 which identifies request types (URL requests) provided by clients for the application. Request types may include write requests, read requests, or other types of requests which may be ignored by the example embodiments. Furthermore, the architecture 100 includes a data flow calculator 140 which is capable of generating a data flow map of the web application hosted by the web server 110 and the application server 120. In some embodiments, the data flow calculator 140 may be a server, a database, a cloud platform, or the like.

The workflow may be triggered by dynamic HTTP requests to the application. Examples of the types of requests include mobile access 101, API calls 102, and end user browser navigation 103. All requests reach the data access determiner 112 running within the web server 110. Here, the data access determiner 112 may forward the request on to the application server 120 for normal processing. In addition, the data access determiner 112 may also perform steps in order to build a data flow map. For example, the data access determiner 112 may determine whether the request is read access or write access (shown in the example of FIG. 2), and assign a direction as either "Read" or "Write". Each request is either a Read request or a Write request, but not both.

For each data item that is accessed by the request, the data access determiner 112 may compute a signature for the data value. The signature can be used to obscure the client data thereby ensuring privacy and security of the client data. One request can access more than one data item hence the data access determiner 112 may generate multiple signatures for one request. These signatures may be used later on to match write requests with read requests. Furthermore, the data access determiner 112 may create a request summary (such as shown in the example of FIG. 3) for each URL request. The request summary may include an identification of a URL associated with a request, a request direction (read or write), signature data, and the like. The data access determiner 112 may send each request summary to a data access repository 130. The data access repository may remove or reduce any duplicate signatures from the list of signatures with the same (request URL, tenant Id) and store them.

The data flow calculator 140 may process requests which have been deduplicated and generate a data flow map. Here, the data flow calculator 140 may retrieve request summaries stored in the data access repository 130 and correlate read requests with write requests. The correlation may be determined based on the data items accessed by each request. For example, if a read request and a write request access the same data items (represented by signatures), the data flow calculator 140 may determine that the read request reads data written by the write request. More than one read request may be paired with each write request. Also, more than one write request may be paired with each request. By processing data from the data access repository 130 and correlating read requests with write requests, the data flow calculator 140 generates the data flow map. The data flow map may be stored in a repository 142 and available for use in security analysis and DAST scenarios. The data flow map provides a tester with a comprehensive understanding of the data flow into and out of the web application thereby enabling the tester to efficiently identify tests.

FIG. 2 illustrates a process 200 of a web server determining a type of URL request in accordance with an example embodiment. In this example, the process 200 may be performed a data access determiner 210 such as the data access determiner 112 shown in FIG. 1, however, embodiments are not limited thereto. Referring to FIG. 2, an HTTP request 201 is received by the data access determiner 210 from a client. In response, the data access determiner 210 may determine whether the HTTP request 201 is a read request, a write request, or a request that can be ignored for purposes of the example embodiments.

In some embodiments, the data access determiner 210 may identify one or more keywords within a path name of a URL of the request. Often, a URL will include an action or other verb at the end of a path which describes the request to be performed. A request may writes data to the application (write request), read data from the application (read request) or do neither and be ignored. Request direction (read versus write) may be used to compute the data flow map. The data access determiner 210 may attempt to determine a direction of the request based on request path name. Path names often end with the purpose of the request, which is usually a verb. For example, if the request link address is https://tomcat.ondemand.com/xi/ajax/call/todoControllerProxy.getTodoList.Data.dwr The system may determine that the request path, in this example, ends with the request for "getTodoListData.dwr" and the keyword (verb) associated therewith is 'get.' Here, a keyword search may be performed on the text description of the URL request to determine the keyword verb. To perform the direction identification, the data access determiner 210 may access one or more tables 212, 214, and 216 of keywords which can be used to identify whether a URL includes a read request or a write request. In the example above, the keyword 'get' is matched to keywords included within table 212 which correspond to read requests. Other examples of verbs that identify read requests include, but are not limited to, fetch, find, list, obtain, read, retrieve, search, seek, and the like. Accordingly, the data access determiner 210 may output a request type 202 indicating the request is a read request to the data flow repository 130 shown in FIG. 1.

Meanwhile, the data access determiner 210 may also store a table 214 of write request indicators. Examples of write request keyword verbs include, but are not limited to, insert, keep mark, put, save, send, set, store, update, write, and the like. In addition, the data access determiner 210 may also manager an ignore table 216 that includes verbs that can be ignored because they are not a read or a write. Examples of keyword verbs that may be ignored include, but are not limited to, are, is, clean, clear, purge, delete, etc.

As an alternative to the keyword verb search, the request direction may be determined based on a payload of the request. For example, if the input payload (request payload) is significantly larger than the output payload (response payload) of the request, the request may be determined to be a write request. Meanwhile, if the output payload (response payload) is significantly larger than the input payload (request payload), the request may be determined to be a read request. In some cases, the payload may be used to determine a direction of the request when the direction cannot be determined based on the verb. As another example, the payload may be used instead or in addition to the verb.

In addition to outputting the request direction 202, the data access determiner 210 may output signatures 203 of the data items which are accessed (i.e., read or written) by the request. FIG. 3 illustrates a summary storage structure 300 for storing a summary of a URL request in accordance with example embodiment. The summary storage structure 300 may include a table that is used commonly for read requests and write requests. Each request may be stored in its own summary storage structure 300. Referring to the example of FIG. 3, the storage structure 300 includes a plurality of keys 302 and a plurality of fields 304 storing respective values corresponding to the keys. In this example, the storage structure 300 includes a key for the request URL and the value of the request URL may include the text of the URL including the path name, without headers. The storage structure also includes a key for a direction indicator (read or write) as well as a tenant ID associated with the request.

After determining request's direction, for each data item being read/written, the data access determiner 210 may further generate a signature 311 on the data value which creates a hash of the data value 312. For read requests, a signature 311 may be generated on data item in the response payload. For write requests, the signature 311 may be generated on data item in the request payload. The signature 311 may be generated as follows:

signature=SHA256 (tenant Id||data)

In this example, the signature 311 is a message digest of SHA256 on an input which includes a tenant Id concatenated with the actual data. Then the signature, instead of the raw value, is stored in the repository. The signature 311 may be performed to preserve data privacy and prevent a customer's personal data from being exposed in the data flow analysis process. The signature 311 does not expose the actual data because hash algorithms are one-way. Accordingly, the data flow mapping may be performed non-intrusively while the web application is live and operating based on requests from clients.

Each request detected by the data access determiner 210 of the web server may be sent to the data access repository 130 (FIG. 1) in the format of the summary storage structure 300 shown in the example of FIG. 3. The data access repository may group the requests into a group request storage format 400 as shown in the example of FIG. 4, which may be used for grouping URL requests of a web application in accordance with an example embodiment. Referring to the example shown in FIG. 4, the group request storage format 400 may include a table with columns for the request URL 402, a type of request 404, a tenant ID 406, and a hash data field 408. Each request may be associated with one URL and one direction. However, the request may include more than one tenant and more than one signature value for each tenant.

In the data access repository 130, the data may be stored in the format 400. Here, the data is organized by request URLs. Each request URL is assigned a direction. In some cases, each request URL is also associated with multiple signatures that are grouped by different tenants in sorted order. In particular, the following ordering conditions are true:

signature_11<signature_12< . . . <signature_1N
signature_21<signature_22< . . . <signature_2N
signature_M1<signature_M2< . . . <signature_MN The ordering can help to correlate write requests and read requests more efficiently then if the signatures were randomly ordered. Whenever a new data access record (i.e., request URL, direction, tenant Id, signature_1, . . . , signature_N) is received from the data access determiner, the list of signatures is added to the table at the row for (request URL, direction, tenant Id). Furthermore, order may be preserved while duplicate signatures are not added. For example, the data access repository 130 may ensure that duplicates are not stored based on the key values of one or more of the URL request, the direction, the tenant ID, the signatures, and the like.

FIG. 5 illustrates a data flow map 500 generated of a data flow of a web-based application in accordance with an example embodiment. Referring to the example of FIG. 5, the map 500 includes write requests assigned to rows of the table and read requests assigned to columns of the table. The write requests may be mapped to the read requests in a many-to-many manner. The rows and the columns overlap with one another to create a two-dimensional grid of cells 502. Each read request and write request pair has its own respective cell within the data flow map 500. Initially, all cell entries within the table may be initialized to a non-matching value such as zero, false, A, etc. Any symbol, letter, number, or other character may be used.

According to various embodiments, the data flow calculator 140 (shown in FIG. 1) may compare signatures of the write requests and the read requests based on the group storage structure 400 stored in the data access repository 130 to generate the data flow map 500. If a write request and a read request have a common tenant ID and at least one signature that is common between them, the data flow calculator 140 may determine that the read request reads data that is written by the corresponding write request. This process may be repeated for each cell in the map 500 and the corresponding write request/read request pairs. Here, if each request includes a group of signatures such as a group of signatures for a write request and a group of signatures for a read request, the signatures only need to partially overlap (at least one) for the data flow calculator 140 to match the two requests together. When a signature of a read request is a match for a signature of a write request, it indicates that the read request reads data from a location where the write request correspondingly writes data. The location may be a data record, a table, a column, a row, a page, or the like.

Accordingly, a cell in the data flow map 500 associated with the pairing of the read request and the write request may be modified to indicate that the read request and the write request are a match. In the example of FIG. 5, a data flow match is signified by the number 1 within the cell 502. The mapping created by the data flow map 500 may be referred to as a many-to-many mapping in which multiple write requests can be mapped to a single read request, and multiple read requests can be mapped to a single write request.

Figure 6:
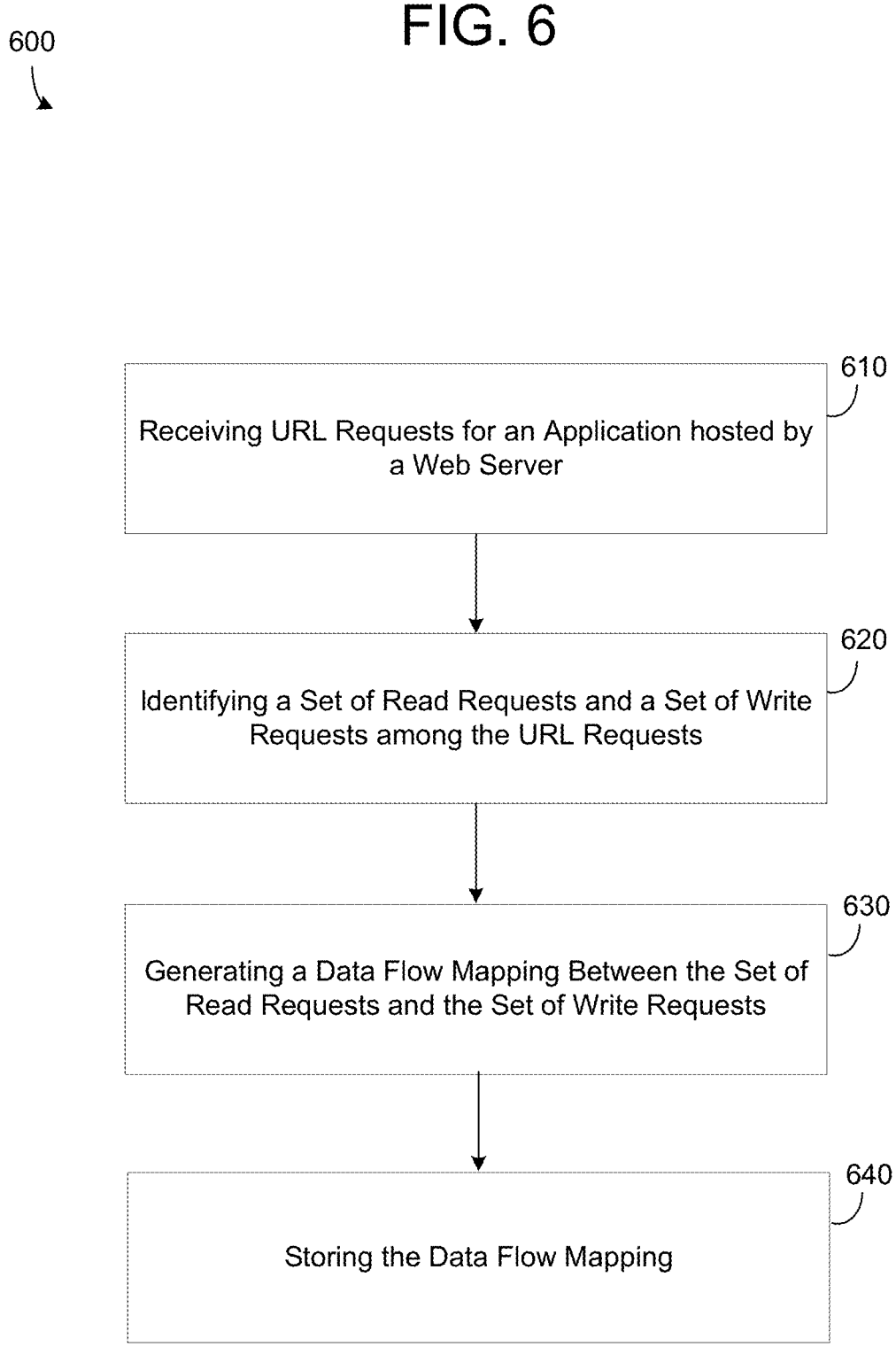
FIG. 6 is a diagram illustrating a method for generating a data flow map in accordance with an example embodiment.

FIG. 6 illustrates a method 600 for generating a data flow map in accordance with an example embodiment. For example, the method 600 may be performed by a server, such as a non-intrusive web layer server. As another example, the method 600 may be performed by a database, a cloud platform, a user device, a combination of devices, and the like. Referring to FIG. 6, in 610, the method may include receiving, via a network, a plurality of URL requests for an application hosted by a web server. The URL requests may be based on mobile access requests, API requests, web-browser based requests, and the like. The URL requests may include a path name within a text of the URL.

In 620, the method may include identifying a set of read requests for the application and a set of write requests for the application, from among the received URL requests. For example, the system may partition the URL requests into mutually exclusive subsets such as a read request subset, a write request subset, a ignored (i.e., not a read or a write) request subset, and the like. In some embodiments, the method may include, for each URL request, determining whether the URL request includes a write request, a read request, a request that can be ignored, or the like, based on one or more keywords within a path of the URL request.

In 630, the method may include generating a data flow mapping identifying which read requests from the set of read requests are associated with which write requests from the set of write requests based on data items accessed by the read requests and the write requests, and in 640, the method may include storing the generated data flow mapping within a storage device. As one example, the data flow mapping may include a table, a chart, or the like, which includes a two-dimensional (2D) map of cells in which the set of read requests are assigned to a set of rows or columns, respectively, along a first dimension of the 2D map, and the set of write requests are assigned to a set of columns or rows, respectively, along a second dimension of the 2D map.

In some embodiments, the method may further include converting each request from among the set of read requests and the set of write requests into a request summary having a common data structure format regardless of whether the request is a read request or a write request. In some embodiments, the method may further include generating a hash-based signature for a data item read by or written by the request, and storing the hash-based signature in place of the data item within the request summary of the respective request. In some embodiments, the generating the data flow mapping may include determining whether each read request from among the set of read requests is associated with each write request from among the set of write requests based on the data items accessed by the read requests and the write requests. In some embodiments, when a read request is determined to be a match with a write request, the generating may include adding a matching indicator to a cell of the data flow mapping that is associated with both the read request and the write request.

Figure 7:
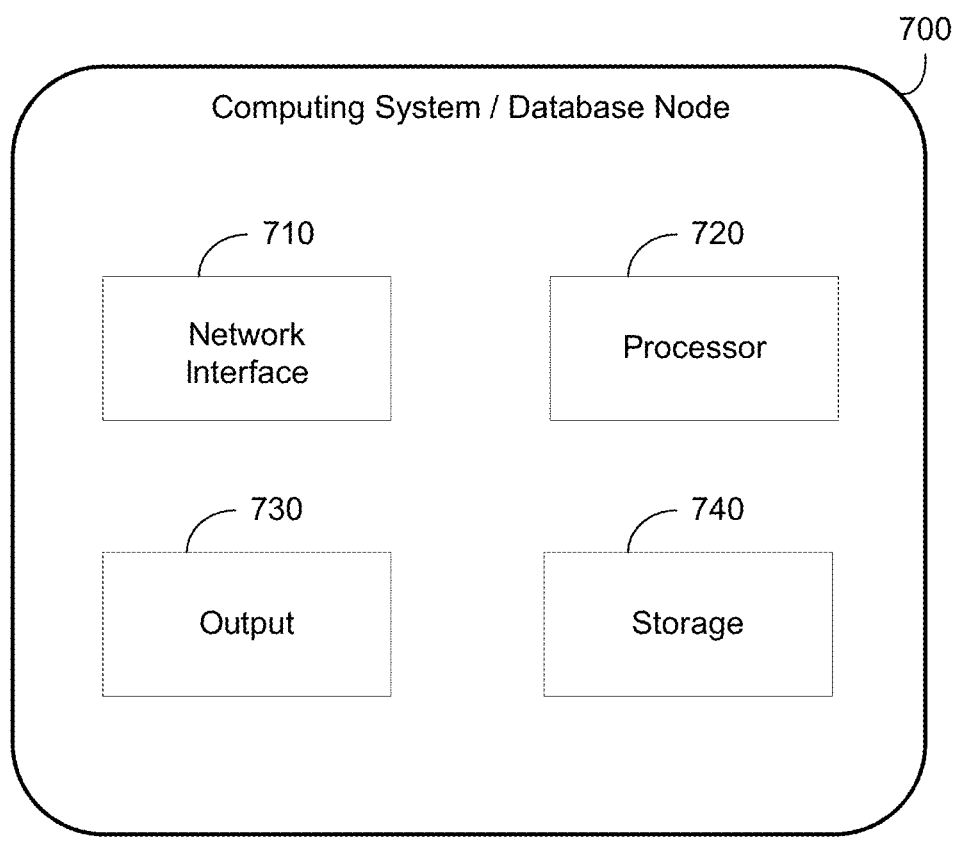
FIG. 7 is a diagram illustrating a computing system for use in the examples herein in accordance with an example embodiment.

FIG. 7 illustrates a computing system 700 that may be used in any of the methods and processes described herein, in accordance with an example embodiment. For example, the computing system 700 may be a database node, a server, a cloud platform, or the like. In some embodiments, the computing system 700 may be distributed across multiple devices, systems, servers, platforms, environments, or the like. Referring to FIG. 7, the computing system 700 includes a network interface 710, a processor 720, an output 730, and a storage device 740 such as an in-memory storage, and the like. Although not shown in FIG. 7, the computing system 700 may also include or be electronically connected to other components such as a display, an input unit(s), a receiver, a transmitter, a persistent disk, and the like. The processor 720 may control the other components of the computing system 700.

The network interface 710 may transmit and receive data over a network such as the Internet, a private network, a public network, an enterprise network, and the like. The network interface 710 may be a wireless interface, a wired interface, or a combination thereof. The processor 720 may include one or more processing devices each including one or more processing cores. In some examples, the processor 720 is a multicore processor or a plurality of multicore processors. Also, the processor 720 may be fixed or it may be reconfigurable. The output 730 may output data to an embedded display of the computing system 700, an externally connected display, a display connected to the cloud, another device, and the like. For example, the output 730 may include a port, an interface, a cable, a wire, a board, and/or the like, with input/output capabilities. The network interface 710, the output 730, or a combination thereof, may interact with applications executing on other devices.

The storage device 740 is not limited to a particular storage device and may include any known memory device such as RAM, ROM, hard disk, and the like, and may or may not be included within a database system, a cloud environment, a web server, or the like. The storage 740 may store software modules or other instructions which can be executed by the processor 720 to perform the method shown in FIG. 6. According to various embodiments, the storage 740 may include a data store having a plurality of tables, partitions and sub-partitions. The storage 740 may be used to store database records, items, entries, and the like.

According to various embodiments, the network interface 710 may receive, via a network, a plurality of URL requests for an application hosted by a web server. Here, the web server may be the computing system 700 or a web server that is accessible to the computing system 700. URL requests may include Hypertext Transfer Protocol (HTTP) requests which include path names, etc., within a text of the URL of the request. Path names may include verbs that identify whether the URL request is a read request, a write request, or some other type of request. Verbs may be related to reading or writing and may be predefined by the system.

According to various embodiments, the processor 720 may identify a set of read requests for the application and a set of write requests for the application, from among the received URL requests. Here, the processor 720 may label the requests as a read request, a write request, a request to be ignored, or the like, based on a verb in a path name of each request, based on a data size of the request, and/or the like. As a result, the URL requests may be partitioned into at least three subsets including read requests, write requests, ignored requests, and the like. Furthermore, the processor 720 may generate a data flow mapping identifying which read requests from the set of read requests are associated with which write requests from the set of write requests based on data items accessed by the read requests and the write requests. Furthermore, the storage 740 may store the generated data flow mapping.

In some embodiments, the URL requests may include one or more of mobile access requests, API access requests, web-browser-based access requests, and the like. Each URL request may be stored as a request summary which includes a common data structure such as shown in the example of FIG. 3. The request summary may identify a request type, a tenant ID, a URL path, one or more signatures, and the like. For each URL request, the processor 710 may be further configured to determine whether the URL request comprises a write request, a read request, a request that can be ignored, or the like, based on one or more keywords within a path of the URL request. In some embodiments, the processor 720 may generate a hash-based signature for a data item read by or written by the respective request, and store the hash-based signature in place of the respective data item within the request summary.

In some embodiments, the processor 720 may determine whether each read request from among the set of read requests is associated with each write request from among the set of write requests based on the data items accessed by the read requests and the write requests. In some embodiments, the data flow mapping may include a 2D map of cells in which the set of read requests are assigned to a set of rows, respectively, along a first dimension of the 2D map, and the set of write requests are assigned to a set of columns, respectively, along a second dimension of the 2D map. An example of the 2D map is shown in FIG. 5. In some embodiments, when a read request is determined to be a match with a write request, the processor 720 may add an identifier or a matching indicator (e.g., the number 1 in FIG. 5, etc.) to a cell of the data flow map that is associated with both the read request and the write request.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a network interface configured to receive, via a network, a plurality of uniform resource locator (URL) requests for an application hosted by a web server;
   a processor configured to identify a set of read requests for the application and a set of write requests for the application, from among the received URL requests, and generate a data flow mapping identifying which read requests from the set of read requests are associated with which write requests from the set of write requests based on data items accessed by the read requests and the write requests; and
   a storage configured to store the generated data flow mapping.

2. The computing system of claim 1, wherein the URL requests for the application comprise one or more of mobile access requests, application programming interface (API) access requests, and browser-based access requests.

3. The computing system of claim 1, wherein, for each URL request, the processor is further configured to determine whether the URL request comprises a write request, a read request, or a request that can be ignored, based on one or more keywords within a path of the URL request.

4. The computing system of claim 1, wherein the processor is further configured to convert each request from among the set of read requests and the set of write requests into a request summary having a common data structure format regardless of whether the request is a read request or a write request.

5. The computing system of claim 4, wherein the processor is further configured to generate a hash-based signature for a data item read by or written by the request, and store the hash-based signature in place of the data item within the request summary of the respective request.

6. The computing system of claim 1, wherein the processor is configured to determine whether each read request from among the set of read requests is associated with each write request from among the set of write requests based on the data items accessed by the read requests and the write requests.

7. The computing system of claim 1, wherein the data flow mapping comprises a two-dimensional (2D) map of cells in which the set of read requests are assigned to a set of rows, respectively, along a first dimension of the 2D map, and the set of write requests are assigned to a set of columns, respectively, along a second dimension of the 2D map.

8. The computing system of claim 1, wherein, when a read request is determined to be a match with a write request, the processor is configured to add a matching indicator to a cell of the data flow mapping that is associated with both the read request and the write request.

9. A method comprising:
   receiving, via a network, a plurality of uniform resource locator (URL) requests for an application hosted by a web server;
   identifying a set of read requests for the application and a set of write requests for the application, from among the received URL requests;
   generating a data flow mapping identifying which read requests from the set of read requests are associated with which write requests from the set of write requests based on data items accessed by the read requests and the write requests; and
   storing the generated data flow mapping within a storage device.

10. The method of claim 9, wherein the URL requests for the application comprise one or more of mobile access requests, application programming interface (API) access requests, and browser-based access requests.

11. The method of claim 9, further comprising, for each URL request, determining whether the URL request comprises a write request, a read request, or a request that can be ignored, based on one or more keywords within a path of the URL request.

12. The method of claim 9, further comprising converting each request from among the set of read requests and the set of write requests into a request summary having a common data structure format regardless of whether the request is a read request or a write request.

13. The method of claim 12, further comprising generating a hash-based signature for a data item read by or written by the request, and storing the hash-based signature in place of the data item within the request summary of the respective request.

14. The method of claim 9, wherein the generating the data flow mapping comprises determining whether each read request from among the set of read requests is associated with each write request from among the set of write requests based on the data items accessed by the read requests and the write requests.

15. The method of claim 9, wherein the data flow mapping comprises a two-dimensional (2D) map of cells in which the set of read requests are assigned to a set of rows, respectively, along a first dimension of the 2D map, and the set of write requests are assigned to a set of columns, respectively, along a second dimension of the 2D map.

16. The method of claim 9, wherein, when a read request is determined to be a match with a write request, the generating comprises adding a matching indicator to a cell of the data flow mapping that is associated with both the read request and the write request.

17. A non-transitory computer readable medium comprising program instructions which when executed are configured to perform a method comprising:
   receiving, via a network, a plurality of uniform resource locator (URL) requests for an application hosted by a web server;
   identifying a set of read requests for the application and a set of write requests for the application, from among the received URL requests;
   generating a data flow mapping identifying which read requests from the set of read requests are associated with which write requests from the set of write requests based on data items accessed by the read requests and the write requests; and
   storing the generated data flow mapping within a storage device.

18. The non-transitory computer readable medium of claim 17, wherein the URL requests for the application comprise one or more of mobile access requests, application programming interface (API) access requests, and browser-based access requests.

19. The non-transitory computer readable medium of claim 17, wherein the method further comprises, for each URL request, determining whether the URL request comprises a write request, a read request, or a request that can be ignored, based on one or more keywords within a path of the URL request.

20. The non-transitory computer readable medium of claim 17, wherein the method further comprises converting each request from among the set of read requests and the set of write requests into a request summary having a common data structure format regardless of whether the request is a read request or a write request.

* * * * *